United States Patent [19]
Garcia, Jr. et al.

[11] Patent Number: 5,042,909
[45] Date of Patent: Aug. 27, 1991

[54] REAL TIME THREE DIMENSIONAL DISPLAY WITH ANGLED ROTATING SCREEN AND METHOD

[75] Inventors: Felix Garcia, Jr., Williamson; Rodney D. Williams, Plano, both of Tex.

[73] Assignee: Texas Instruments Incorporated, Dallas, Tex.

[21] Appl. No.: 584,413

[22] Filed: Sep. 17, 1990

Related U.S. Application Data

[63] Continuation of Ser. No. 390,473, Aug. 3, 1989, abandoned, which is a continuation of Ser. No. 231,638, Aug. 8, 1988, abandoned, which is a continuation of Ser. No. 105,924, Oct. 7, 1987, abandoned.

[51] Int. Cl.$^5$ .................. G02B 27/22; H04N 13/04
[52] U.S. Cl. .................. 359/478; 358/88; 358/89
[58] Field of Search ............ 350/144; 353/7; 352/61; 340/724, 727; 358/88, 89, 90; 434/43, 44

[56] References Cited

U.S. PATENT DOCUMENTS

| | | | |
|---|---|---|---|
| 3,140,415 | 7/1964 | Ketchpel | 358/88 X |
| 3,583,784 | 6/1971 | Vestal et al. | 434/44 |
| 3,956,833 | 5/1976 | Chase | 358/89 X |
| 4,871,231 | 10/1989 | Garcia, Jr. | 350/144 |
| 4,922,336 | 5/1990 | Morton | 358/88 |

FOREIGN PATENT DOCUMENTS 56-074219 9/1981 Japan.
0257695 12/1985 Japan .................. 358/88

OTHER PUBLICATIONS

"Investigation of a 3D Display Using Optical Fiber Sheets"; Yamada et al.; Gazodenshigakkaishi. vol. 16, #6, pp. 372-379; May '87.

Primary Examiner—Victor R. Kostak
Attorney, Agent, or Firm—N. Rhys Merrett; Melvin Sharp; L. Joy Griebenow

[57] ABSTRACT

A three dimensional display wherein a scanned light beam is displayed upon a rotating display member rotating about a fixed axis for receiving and displaying the scanned light beam on a first surface thereof, fixed points in the display impinging upon the display member to display a harmonic motion along an axis passing through the scanned light beam in response to rotation of the display means. In accordance with a second embodiment of the invention, the display member is translucent and a second scanned light beam is displayed upon an opposing surface of the display member for receiving and displaying the second scanned light beam on the opposing surface thereof to display a harmonic motion along an axis passing through the second scanned light beam in response to rotation of the display means.

55 Claims, 2 Drawing Sheets

REAL TIME THREE DIMENSIONAL DISPLAY WITH ANGLED ROTATING SCREEN AND METHOD

This application is a continuation of application Ser. No. 390,473, filed Aug. 3, 1989, now abandoned, which is a continuation of application Ser. No. 231,638, filed Aug. 8, 1988, now abandoned, which is a continuation of application Ser. No. 105,924, filed Oct. 7, 1987, now abandoned.

BACKGROUND OF THE INVENTION

1. Field of the Invention

This invention relates to a three dimensional display system and, more specifically, to a system capable of displaying images on a screen in three dimensions wherein one or more such images can be projected in two dimensions from either the same side of the screen or from opposite sides thereof.

2. Brief Description of the Prior Art

It has been known in the prior art to modulate or scan a beam, such as a laser beam and then to project the scanned beam onto a screen. Examples of such systems are set forth in Baker U.S. Pat. Nos. 3,471,641 and 3,549,800.

It has also been long desired to provide a three dimensional display. Prior art systems for creating such a display have involved moving a flat plate mirror or flexing a plastic mirror to reflect a CRT image to create a volume display. Similar techniques have employed a Mylar membrane stretched over a metal ring and silvered on the from surface, such mirror being vibrated to reflect the information displayed on the CRT in synchronism with the mirror motion. Such techniques and techniques for converting a cathode ray tube two dimensional display into a three dimensional image are discussed in the article "Terminal Puts 3-Dimensional Graphics on Solid Ground", by Harry S. Stover, *Electronics*, Jul. 28, 1961.

Prior art three dimensional display techniques were limited because of their use with CRT screens in that the produced image may be viewed only from selected angles. Moreover, such prior art systems have generally not been able to produce real time images and have been limited in the possible vibration frequencies of the screens. Moreover, the use of vibrating mirrors has created difficulties due to the relatively large mass of the mirrors which prevent substantial deflections. For example, such prior art systems have generally been capable of providing a mirror displacement of about 0.4 millimeters.

A need thus arose for a simple and economical three dimensional display system that could produce substantial displacement at a variety of frequencies in order to provide three dimensional images which can be view from all angles. A system which solved this problem is disclosed in Sher U.S. Pat. No. 4,130,832 wherein the three dimensional display includes a laser which directs a beam of light toward a mirror, the mirror being moved In an X-Y plane by piezoelectric transducers. The reflected light beam is directed to a vibrating screen which is moved by a piezoelectric transducer to form a three dimensional image. This system, while providing the desired result, is limited as to the size of the image displayed since the screen and image size are determined by the size of the piezoelectric transducer. Also, this system is affected by G forces, thereby presenting problems where such forces exist, such as in aircraft. The above noted prior art is incorporated herein by reference. In addition, U.S. Pat. Nos. 1,794,103, 3,682,553 and 3,970,361 set forth typical prior art displays of the above noted type.

SUMMARY OF THE INVENTION

In accordance with the present invention, the above noted problems of the prior art are minimized and there is provided a three dimensional display system which is not substantially affected by G forces and wherein the size of the displayed image and screen is determined by the size of a disk and motor. The system in accordance with the present invention can be used, for example, in business and industry uses, such as solid animation, radar display, molecular research, resonant frequency and harmonics display, military, computer graphics and the like.

The system in accordance with a first embodiment thereof includes a disk-like screen connected to the end of a motor shaft. The disk is attached to the shaft of a motor at a 45 degree angle, though this angle can be varied to provide a larger or smaller height or z-axis dimension, so that, as the disk rotates, a displacement of any given point thereon along the z axis takes place. The image is formed on the screen by projecting a light beam, such as from a laser, through a modulator and toward a scanner which produces an x-y scan of the beam on a screen, the screen herein being the disk discussed hereinabove. The disk can be translucent, such as lucite, so that images can be projected thereon onto the front and/or rear surfaces thereof The modulation or strobing of the scan is then synchronized with the rotating disk by control of the motor speed so that a three dimensional pattern appears on the screen. It can be seen that any point on the x-y scan from the scanner which impinges upon the screen will move along a z-axis direction since the screen or disk at that point produces such z-axis movement. This movement of the displayed image provides the three dimensional effect. The adjustment of the angle between the disk surface and the x-y plane of the scanned x-y image will determine the z dimension or height of the three dimensional image, the disk angle being adjustable on-line, if so desired.

While, in the preferred embodiment, the disk herein is a planar opaque screen for receiving a scanned image thereon on one surface thereof, the screen can take many other forms. For example, the disk can be translucent, such as lucite, and thereby capable of receiving a scanned image therein on both major surfaces. The lucite disk can be in the form of a pair of angularly truncated cylinders with the same which fit together at the angularly truncated surfaces to form a net cylinder wherein the surfaces at which truncation takes place are translucent. In addition, the screen can take on shapes other than planar, it merely being necessary that at least some portion thereof move in the z direction during rotation thereof while projection of the x-y image thereon takes place to provide the three dimensional image. As a further embodiment, the disk can be placed in a gas filled or evacuated CRT with the image impinging thereon being the scanned beam of the tube. Phosphors can be disposed on the disk which, when excited, will form the three dimensional image. As a still further embodiment, the screen can be planar and disposed normal to the projected x-y image. The three dimensional affect is then provided by moving the entire screen along the z-axis in synchronism with the scanned x-y image to provide the three dimensional affect. A cam driven shaft attached to the screen can provide such screen movement along the z-axis.

DESCRIPTION OF THE PREFERRED EMBODIMENTS

Figure 1:
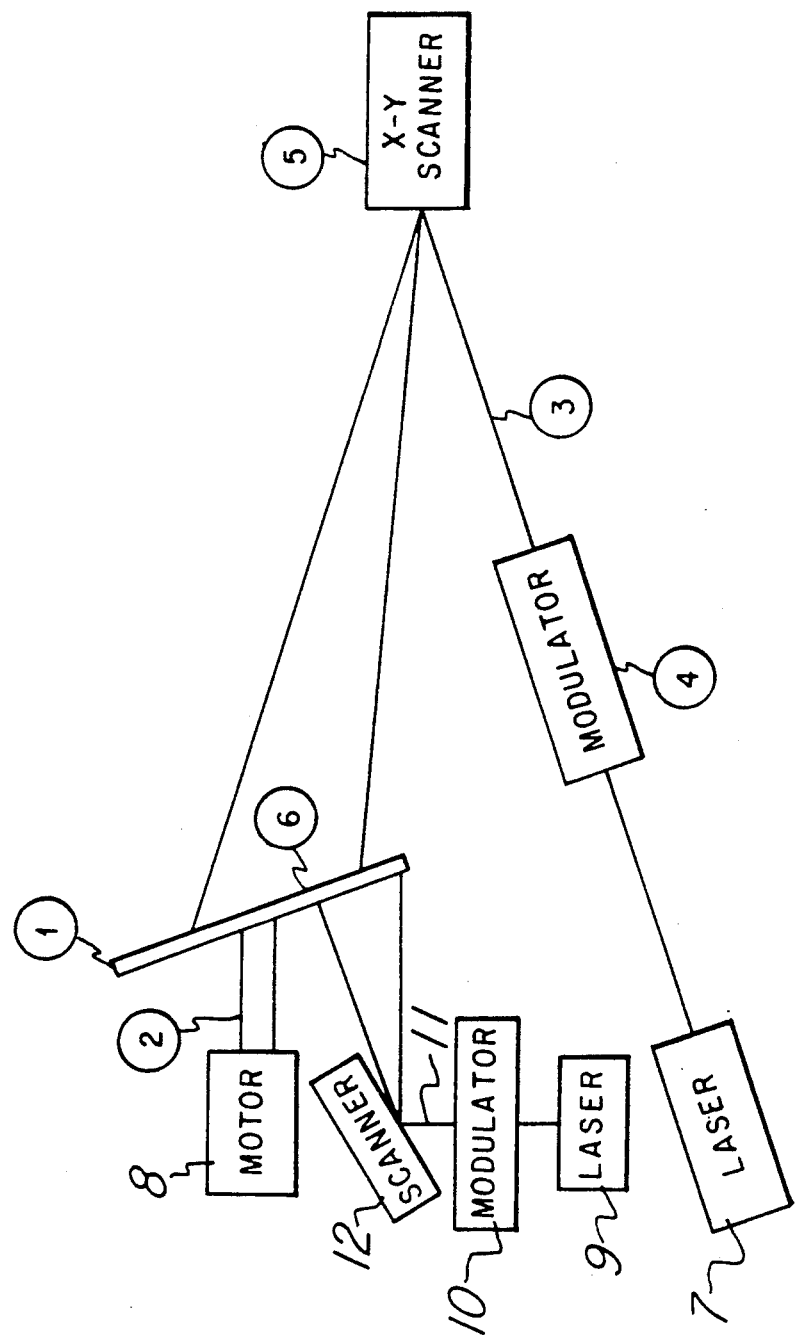
FIG. 1 is a schematic diagram of a three dimensional display system utilizing a screen in accordance with the present invention.

Referring now to FIG. 1, there is shown a schematic diagram of a system in accordance with the present invention. The system includes a laser 7 which projects a light beam through a modulator 4 onto an x-y scanner 5. The modulator 4 is externally controlled in predetermined manner (not shown) to control the intensity of the laser light beam 3 passing therethrough. It is understood that the light intensity can be controlled so that no light passes through the modulator, when so desired. The x-y scanner, whose scanning rate is externally controllable in standard manner (not shown), scans the light beam 3 from the modulator along an x-y plane and projects this x-y image 6 onto a screen 1 in the form of a disk as will be explained hereinbelow. All of the structure described to this point except for the particular screen and its operation is well known and described in the above noted prior art and elsewhere.

Figure 2:
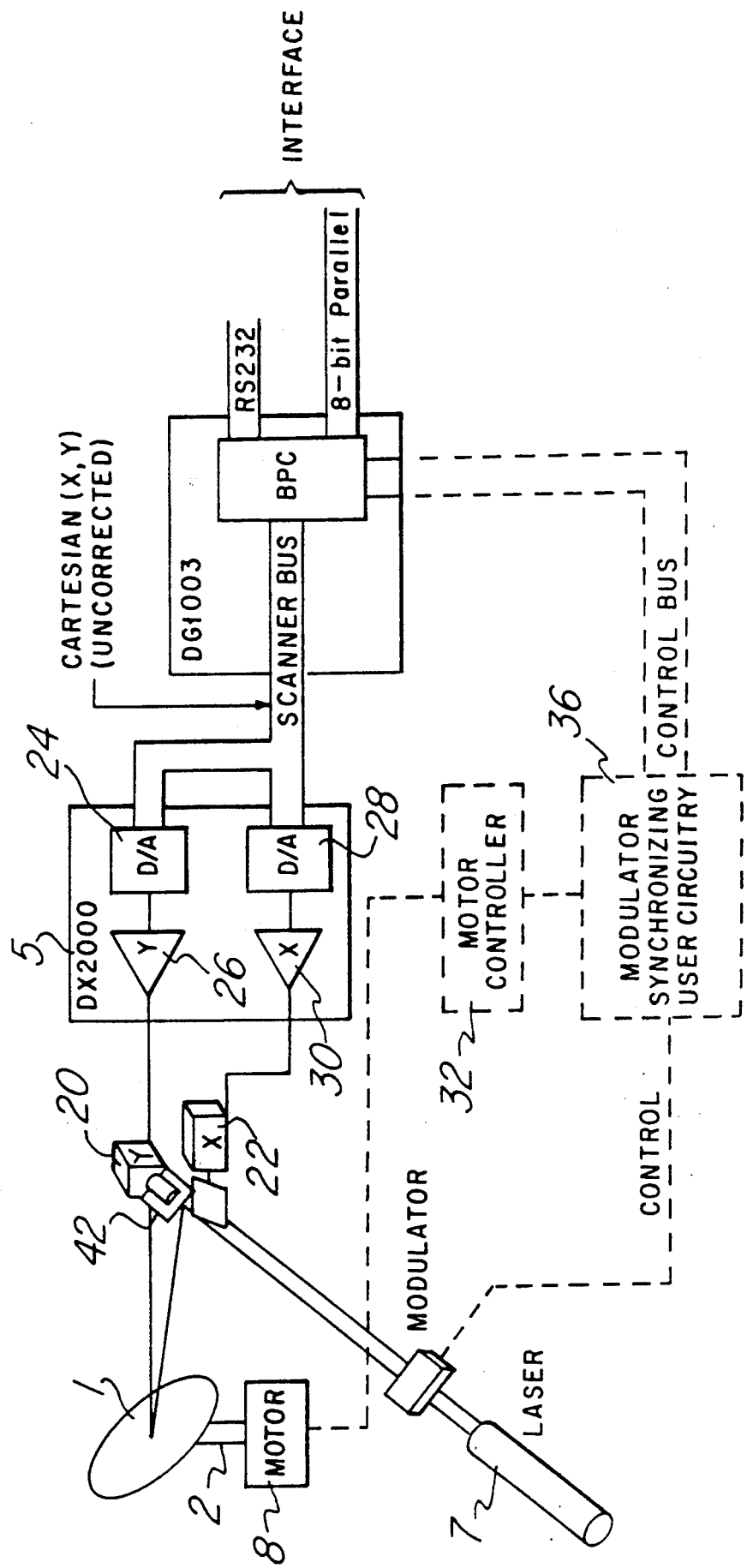
FIG. 2 is a circuit diagram showing synchronization of the scanner with the rotation of the display screen.

The screen 1 is rotated by a motor 8 via a shaft motor 2, the motor speed being controllable by means of a controller (not shown). The motor speed is preferably synchronized with the scanning rate of the scanner 5. One typical circuit for providing such synchronization is shown in FIG. 2 so that the same spot on the disk is always present to receive a particular part of the x-y scan projected thereon. The circuit of FIG. 2 will be explained hereinbelow.

The screen 1 can be a standard type movie screen if it is to be viewed from only one side thereof, as for the system described herein thus far. The screen angle is preferably 45 degrees with respect to the image received from the scanner. However, this angle can be altered about 45 degrees in either direction, the effect of such angle alteration being to vary the height or z-dimension of the displayed image with continued change in such angle. The screen angle is variable on line, it so desired, by a structure (not shown) of known type which rotates the mirror on the shaft 2.

Referring now to FIG. 2, wherein like reference numerals refer to like structure as in FIG. 1, the scanner 5 is controlled by signals on the GSI scanner bus which are which are derived from the control bus. The signals on the control bus are provided by the synchronizing user circuitry which can be manually controlled, such as by the control input thereto. The circuitry 36 also controls the motor controller 32 to control the speed of the motor 8. The circuitry 36 can also control the modulator 4 via modulator control circuitry 34. Such circuitry is well known. The scanner 5 includes a digital to analog converter 24 which provides a Y-axis signal via amplifier 26 and a digital to analog converter 28 which provides an X-axis signal via amplifier 30. The signals from amplifiers 26 and 30 control x-axis and y-axis scanning devices 20 and 22 respectively which position a mirror 42 which reflects the modulated light beam from the laser 7.

In operation, a light beam from the laser 7 is modulated by the externally controllable modulator 4 to provide a modulated beam 3 which strikes the x-y scanner 5, the latter having an externally controllable scanning rate as determined by signals on the GSI scanner bus and the control bus of FIG. 2. The scanner 5 scans the light beam in an x-y plane via the mirror 42 onto the rotating screen 1, the speed of rotation of the screen 1 being synchronized to the scanning rate of the scanner 5 as explained hereinabove. As has been explained hereinabove, any point of light in the x-y plane impinging upon the screen 1 will display a harmonic type motion in the z-plane due to the similar movement of points on the screen. Accordingly, if the scanning rate of the scanner and the rotation rate of the screen are sufficiently high, light impinging upon the screen at any point on the screen will move along the z-axis sufficiently rapidly to appear as a complete line, as is well known. The result is a three dimensional display with height determined by the angle of the screen.

In accordance with a second embodiment of the invention, the system above described is duplicated except that the screen 1 is translucent to permit viewing therethrough. In this manner, images in three dimensions can be provided on both sides of the screen. This is accomplished, with reference to the FIGURE, by providing a second image forming system, identical to that already described, and including a second laser 9, a modulator 10 and a scanner 12 for receiving and scanning the modulated beam 11. The second system operates in the same manner as does the system already described and projects the scanned image in a second x-y plane against the rear surface of the translucent screen 1. This image will move in the z-direction in the same manner as above described except that it will be disposed behind the screen. However, due to the translucent property of the screen 1, both images will be visible in three dimensions from either side of the screen.

While the invention has been described with respect to a rotating screen in the form of a disk disposed at an angle relative to the x-y plane of the scanned beam, it should be understood that other shapes of screen can be substituted for that disclosed.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modification.

What is claimed is:

1. A three dimensional display system comprising:
   (a) a light source for generating a light beam,
   (b) means to form an image from said light beam in a predetermined x-y plane and transmit said image along a predetermined axis passing through said x-y plane;
   (c) rotating light receiving means having an axis of rotation along said predetermined axis for receiving and displaying said image, said light receiving means being rotatable about said predetermined axis, said light receiving means, in all of its stationary states, having continuous contiguous portions thereof at progressively different distances from said x-y plane.

2. A display system as set forth in claim 1 wherein said means to form an image comprises scanning means to scan said light beam, further including means to control one of the speed of rotation of said display and the scanning rate of said means to scan relative to the other.

3. A display system as set forth in claim 1 further including means to control the intensity of said light beam.

4. A display system as set forth in claim 3 wherein said means to form an image comprises scanning means to scan said light beam, further including means to control one of the speed of rotation of said display and the scanning rate of said means to scan relative to the other.

5. A three dimensional display system comprising:
(a) a light source for generating a light beam,
(b) means to form an image from said light beam in a predetermined x-y plane and transmit said image along a predetermined axis passing through said x-y plane; and
(c) rotating light receiving means having an axis of rotation along said predetermined axis for receiving and displaying said image, said light receiving means being rotatable about said predetermined axis, said light receiving means, in all of its stationary states, having contiguous portions thereof at progressively different distances from said x-y plane wherein said rotating light receiving means is a planar member.

6. A display system as set forth in claim 5 wherein said means to form an image comprises scanning means to scan said light beam, further including means to control one of the speed of rotation of said display and the scanning rate of said means to scan relative to the other.

7. A display system as set forth in claim 5 further including means to control the intensity of said light beam.

8. A display system as set forth in claim 7 wherein said means to form an image comprises scanning means to scan said light beam, further including means to control one of the speed of rotation of said display and the scanning rate of said means to scan relative to the other.

9. A display system as set forth in claim 5 wherein said planar member makes an acute angle with said predetermined axis.

10. A display system as set forth in claim 9 wherein said means to form an image comprises scanning means to scan said light beam, further including means to control one of the speed of rotation of said display and the scanning rate of said means to scan relative to the other.

11. A display system as set forth in claim 9 further including means to control the intensity of said light beam.

12. A display system as set forth in claim 6 wherein said means to form an image comprises scanning means to scan said light beam, further including means to control one of the speed of rotation of said display and the scanning rate of said means to scan relative to the other.

13. A three dimensional display system comprising:
(a) a light source for generating a light beam,
(b) means to scan said light beam along an x-y plane; and
(c) rotating light receiving means receiving and displaying said scanned light beam, said light receiving means being rotatable about a fixed axis, said light receiving means, in all of its stationary states, having portions thereof at progressively different distances from said means to scan, further including a second light source for generating a second light beam and second means to scan said second light beam along an x-y plane said rotating light receiving means receiving and displaying said second scanned light beam.

14. A display system as set forth in claim 13 wherein said rotating light receiving means is translucent.

15. A display system as set forth in claim 14 wherein said rotating light receiving means is a planar member.

16. A display system as set forth in claim 15 wherein said planar member makes an acute angle with a line normal to said x-y plane.

17. A display system as set forth in claim 14 further including means to control the intensity of said second light beam.

18. A display system as set forth in claim 15 further including means to control the intensity of said second light beam.

19. A display system as set forth in claim 16 further including means to control the intensity of said second light beam.

20. A display system as set forth in claim 14 further including means to control one of the speed of rotation of said display and the scanning rate of each of said means to scan relative to the other.

21. A display system as set forth in claim 15 further including means to control one of the speed of rotation of said display and the scanning rate of each of said means to scan relative to the other.

22. A display system as set forth in claim 16 further including means to control one of the speed of rotation of said display and the scanning rate of each of said means to scan relative to the other.

23. A display system as set forth in claim 17 further including means to control one of the speed of rotation of said display and the scanning rate of each of said means to scan relative to the other.

24. A display system as set forth in claim 18 further including means to control one of the speed of rotation of said display and the scanning rate of each of said means to scan relative to the other.

25. A display system as set forth in claim 19 further including means to control one of the speed of rotation of said display and the scanning rate of each of said means to scan relative to the other.

26. A three dimensional display system comprising:
(a) a light source for generating a light beam,
(b) means to form an image from said light beam in a predetermined x-y plane and transmit said image along a predetermined axis passing through said x-y plane;
(c) rotating display means having an axis of rotation along said predetermined axis for receiving and displaying said image on a first surface thereof, fixed points in said x-y plane impinging upon said display means displaying a substantially harmonic motion along said predetermined axis in response to said rotation of said display means.

27. A display system as set forth in claim 26 wherein said means to form an image comprises scanning means to scan said light beam, further including means to control one of the speed of rotation of said display and the scanning rate of said means to scan relative to the other.

28. A three dimensional display system comprising:
(a) a light source for generating a light beam,
(b) means to scan said light beam along an x-y plane; and
(c) rotating display means rotating about a fixed axis for receiving and displaying said scanned light beam on a first surface thereof, fixed points in said x-y plane impinging upon said display means displaying a harmonic motion along an axis passing through said x-y plane in response to said rotation of said display means, further including a second light source for generating a second light beam and second means to scan said second light beam along an x-y plane, said rotating display means receiving and displaying said second scanned light beam on a surface thereof opposed to said first surface.

29. A display as set forth in claim 28 wherein said rotating display means is translucent.

30. A three dimensional display system comprising:
(a) a light source for generating a light beam,
(b) means to form an image from said light beam in a predetermined x-y plane and transmit said image along a predetermined axis passing through said x-y plane; and
(c) rotating display means having an axis of rotation along said predetermined axis for receiving and displaying said image on a first surface thereof, fixed points in said x-y plane impinging upon said display means displaying a substantially harmonic motion along said predetermined axis in response to said rotation of said display means;
(d) means to control one of the speed of rotation of said display means and the scanning rate of said means to scan relative to the other; and
(e) a second light source for generating a second light beam and second means to scan said second light beam along an x-y plane, said rotating display means receiving and displaying said second scanned light beam on a surface thereof opposed to said first surface.

31. A display as set forth in claim 30 wherein said rotating display means is translucent.

32. A three dimensional display system comprising:
(a) a light source for generating a light beam,
(b) means to form an image from said light beam in a predetermined x-y plane and transmit said image along a predetermined axis passing through said x-y plane; and
(c) rotating display means having an axis of rotation along said predetermined axis for receiving and displaying said image on a first surface thereof, fixed points in said x-y plane impinging upon said display means displaying a substantially harmonic motion along said predetermined axis in response to said rotation of said display means, wherein said rotating display means is translucent.

33. A display system as set forth in claim 32 further including means to control one of the speed of rotation of said display means and the scanning rate of said means to scan relative to the other.

34. A three dimensional display system comprising:
(a) a light source for generating a light beam,
(b) means to form an image from said light beam in a predetermined two-dimensional space and transmit said image along a predetermined path having an axis passing through said space;
(c) rotating light receiving means having a rotating light receiving surface, the axis of rotation of said surface having a component continuously along said predetermined axis, for receiving and displaying said image, said light receiving surface, in all of its stationary states, having continuous contiguous portions thereof at progressively different distances from said two-dimensional space.

35. A display system as set forth in claim 34 wherein said means to form an image comprises scanning means to scan said light beam, further including means to control one of the speed of rotation of said display and the scanning rate of said means to scan relative to the other.

36. A display system as set forth in claim 34 further including means to control the intensity of said light beam.

37. A display system as set forth in claim 36 wherein said means to form an image comprises scanning means to scan said light beam, further including means to control one of the speed of rotation of said display and the scanning rate of said means to scan relative to the other.

38. A three dimensional display system comprising:
(a) a light source for generating a light beam,
(b) means to form an image from said light beam in a predetermined two-dimensional space and transmit said image along a predetermined path having an axis passing through said space; and
(c) rotating light receiving means having a rotating light receiving surface, the axis of rotation of said surface having a component continuously along said predetermined axis, for receiving and displaying said image, said light receiving surface, in all of its stationary states, having contiguous portions thereof at progressively different distances from said two-dimensional space, wherein said rotating light receiving means is a planar member.

39. A display system as set forth in claim 38 wherein said planar member makes an acute angle with said predetermined axis.

40. A display system as set forth in claim 39 further including means to control one of the speed of rotation of said display and the scanning rate of said means to scan relative to the other.

41. A display system as set forth in claim 38 further including means to control one of the speed of rotation of said display and the scanning rate of said means to scan relative to the other.

42. A display system as set forth in claim 37, further including a second light source for generating a second light beam, second means to form a second image from said second light beam in a second predetermined two-dimensional space and transmit said second image along a second predetermined path having an axis passing through said second space, said rotating light receiving means having a second rotating light receiving surface, the axis of rotation of said second surface having a component continuously along said predetermined axis, for receiving and displaying said second image, said second light receiving surface, in all of its stationary states, having contiguous portions thereof at progressively different distances from said second two-dimensional space.

43. A display system as set forth in claim 42 wherein said rotating light receiving means is translucent.

44. A display system as set forth in claim 43 further including means to control the intensity of said second light beam.

45. A display system as set froth in claim 44 further including means to control one of the speed of rotation of said display and the scanning rate of each of said means to scan relative to the other.

46. A three dimensional display system comprising:
(a) a light source for generating a light beam,
(b) means to form an image from said light beam in a predetermined two-dimensional space and transmit said image along a predetermined path having an axis passing through said space; and (c) rotating light receiving means having a rotating light receiving surface, the axis of rotation of said surface having a component continuously along said predetermined axis, for receiving and displaying said image, said light receiving surface, in all of its stationary states, having contiguous portions thereof at progressively different distances from said two-dimensional space, further including a second light source for generating a second light beam, second means to form a second image from said second light beam in a second predetermined two-dimensional space and transmit said second image along a second predetermined path having an axis passing through said second space, said rotating light receiving means having a second rotating light receiving surface, the axis of rotation of said second surface having a component continuously along said predetermined axis, for receiving and displaying said second image, said second light receiving surface, in all of its stationary states, having contiguous portions thereof at progressively different distances from said second two-dimensional space.

47. A display system as set forth in claim 46 further including means to control the intensity of said light beam.

48. A display system as set forth in claim 47 wherein said rotating light receiving means is translucent.

49. A display system as set forth in claim 46 further including means to control one of the speed of rotation of said display and the scanning rate of said means to scan relative to the other.

50. A display system as set forth in claim 49 wherein said rotating light receiving means is translucent.

51. A display system as set forth in claim 46 wherein said rotating light receiving means is translucent.

52. A display system as set forth in claim 51 further including means to control one of the speed of rotation of said display and the scanning rate of each of said means to scan relative to the other.

53. A three dimensional display system comprising:
(a) a light source for generating a light beam,
(b) means to form an image from said light beam in a predetermined two dimensional space and to transmit said image; and
(c) rotating light receiving means having a rotating light receiving surface, the axis of rotation of said surface intersecting said two dimensional space for receiving and displaying said image on said rotating light receiving surface, light transmitted towards fixed points in said space impinging upon said surface displaying a substantially harmonic motion in a direction along said axis in response to said rotation of said surface.

54. A display system as set forth in claim 53 further including a second light source for generating a second light beam and second means to form a second image in a second two dimensional space, said rotating light receiving means receiving and displaying said second image on a surface thereof opposed to said first surface.

55. A display as set forth in claim 54 wherein said rotating display means is translucent.

* * * * *